(12) United States Patent
Rosenkranz

(10) Patent No.: US 8,704,123 B2
(45) Date of Patent: Apr. 22, 2014

(54) METHOD OF CREATING A POSITIVE SUBSTANCE JOINT BETWEEN COMPONENTS

(75) Inventor: Steffen Rosenkranz, Beckum (DE)

(73) Assignee: Hella KGAA, Lippstadt (DE)

( * ) Notice: Subject to any disclaimer, the term of this patent is extended or adjusted under 35 U.S.C. 154(b) by 379 days.

(21) Appl. No.: 13/093,566

(22) Filed: Apr. 25, 2011

(65) Prior Publication Data

US 2011/0265947 A1    Nov. 3, 2011

(51) Int. Cl.
*B23K 26/42*    (2006.01)
*B23K 33/00*    (2006.01)
*B23K 26/20*    (2006.01)

(52) U.S. Cl.
USPC ............ 219/121.64; 219/137 R; 228/135; 228/136; 228/44.3; 29/428

(58) Field of Classification Search
USPC ......... 439/874, 877, 880, 881; 228/135, 136, 228/44.3; 219/121.13, 121.14, 121.63, 219/121.64, 121.48, 121.45, 121.46, 219/121.11, 137 R; 29/428–525.15; 156/304.1–304.6
See application file for complete search history.

(56) References Cited

U.S. PATENT DOCUMENTS

| | | | | |
|---|---|---|---|---|
| 4,654,505 A | * | 3/1987 | Sciaky et al. | 219/121.63 |
| 4,687,264 A | * | 8/1987 | Shuey | 439/92 |
| 4,692,121 A | * | 9/1987 | Arbogast, Jr. | 439/874 |
| 4,774,394 A | * | 9/1988 | Lemke | 219/121.6 |
| 5,300,755 A | * | 4/1994 | Nishitani et al. | 219/121.63 |
| 5,442,155 A | * | 8/1995 | Nihei et al. | 219/130.01 |
| 5,541,365 A | * | 7/1996 | Sugiura et al. | 174/94 R |
| 5,616,261 A | * | 4/1997 | Forrest | 219/121.63 |
| 6,936,785 B2 | * | 8/2005 | Oishi | 219/56.22 |

FOREIGN PATENT DOCUMENTS

EP        0251556    *    7/1988

* cited by examiner

*Primary Examiner* — Samuel M Heinrich
(74) *Attorney, Agent, or Firm* — Husch Blackwell LLP; Robert C. Haldiman; H. Frederick Rusche

(57) ABSTRACT

A method of creating a positive substance joint between components (1,2) involves the provisioning of the components (1, 2) and placing them at a joining position in relation to one another such that they contact at least one joining point or are kept apart by a narrow joining gap. The components (1, 2) feature a locating device that forces the components (1, 2) to fit and interlock in their relative position at the joining point. The components (1, 2) are then joined by a positive substance joint.

11 Claims, 5 Drawing Sheets

METHOD OF CREATING A POSITIVE SUBSTANCE JOINT BETWEEN COMPONENTS

Figure 1:
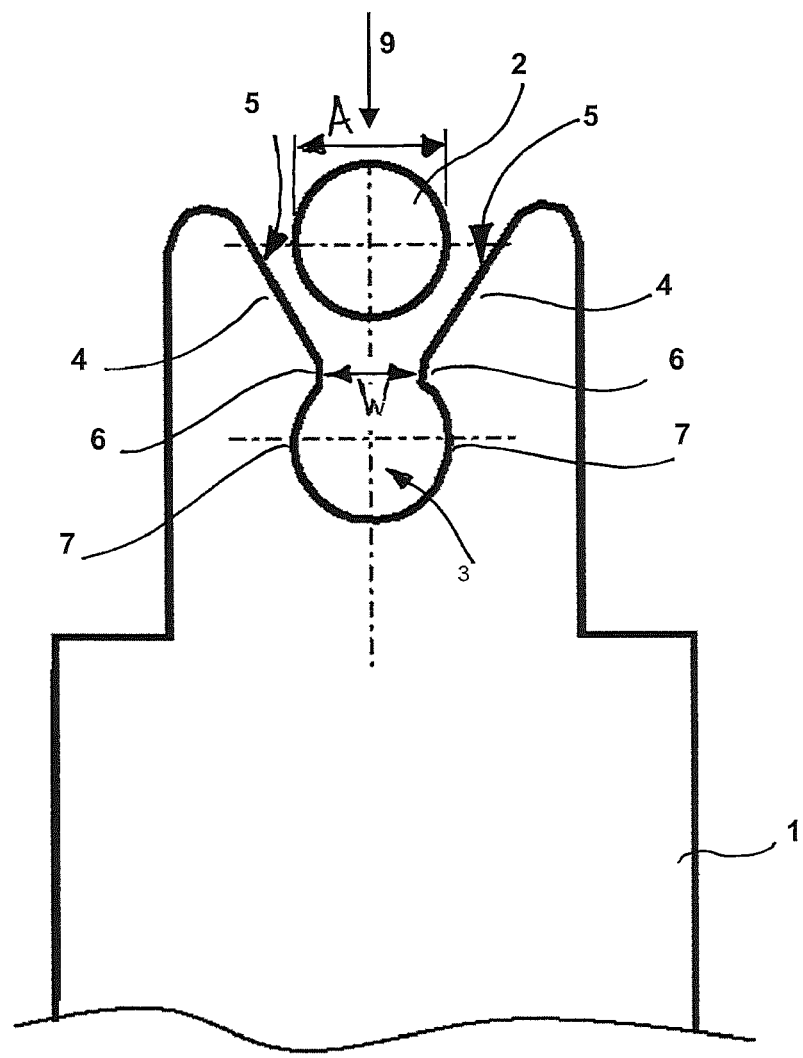

The present invention relates to a method of creating a positive substance joint between components, wherein the components are provided and placed at the joining position in relation to one another such that they contact at least one joining point or are kept apart by a narrow joining gap, and wherein the components are joined by a positive substance joint at the joining point.

An equivalent method of welding a wire-shaped electric conductor to a connecting contact of an electrical component is known from common practice. The prior art method involves using a positioning device to place the conductor and the connecting contact at a joining position at which the conductor contacts the connecting contact at a joining point. At a next step, a welding head and a nozzle are placed at the joining point to feed inert gas to said point in order to weld the conductor to the connecting contact. During the welding process, the positioning device tightly holds the components to be welded at the joining point.

The disadvantage of said method is that a comparatively complicated positioning device is required to place and hold the components to be welded. Since said positioning device is very close to the joining point, it may be damaged during the welding process, e.g. by radiant heat, heat conduction and weld spatter. Another unfavorable effect is that, while welding, the device restricts the access to the joining point. Moreover, the device obscures the view of the joining point. Before starting to weld, it is therefore difficult to verify whether the components to be welded are correctly placed and, thus, whether welding will be successful and without faults.

The task of the present invention is to develop a method of the aforementioned type such that said method is easy to use and allows the components to be placed at their correct relative positions before a positive substance joint is produced.

This task is accomplished by the components having a locating device, by the components being forced by the locating device to fit and interlock in their relative position at the joining position, and by a positive substance joint joining up the components afterwards.

This is to say that the locating device is integrated in the components and can particularly make up an integral whole with them. This provides a simple means of interlocking and holding the components at a relative position at the joining point. There is therefore no need for a separate and complicated positioning and/or clamping device. Since the locating device can be very compact in size, free access to the joining point is retained after placing the components at the joining point. The locating device may stay on the components after the positive substance joint has been produced.

In a preferred embodiment of the invention, a locating slot is molded onto a first component such that opposing wall sections delimit the slot at its sides and such that the clear width between said wall sections is a little narrower than the corresponding dimension of a locating tongue of a second component to slot into the locating slot, wherein at least one of the opposing wall sections is back-tapered, wherein the locating tongue is set to a preliminary mounting position when the components are placed such that said locating tongue is at a position opposite the locating slot, and wherein the locating tongue then resiliently deforms at least one of the opposing wall sections as it is pushed into the locating slot such that the back taper creates a positive and non-positive joint to the locating tongue. This will make the method even easier to use.

The method benefits from the point at which the positive substance joint between the components is produced being located on the locating device. This will enhance the accuracy of the relative components positions at the joining point.

In an advantageous embodiment, the locating slot has at least one chamfered side for inserting the locating tongue. This will make it easier to insert the locating tongue of the one component into the locating slot of the other component when the two components are being placed.

The locating slot is preferably located between two fork-like locking lugs of the first component, wherein sections protrude from the inner face of the locking lugs facing the locating slot. As the locating tongue inserts into the locating slot it resiliently deflects the locking lugs away from their normal position. When the locating tongue is fully inserted into the locating slot, the locking lugs will snap back into their normal position such that their protrusions reside behind the locating tongue and hold it inside the locating slot.

In an advantageous embodiment, the second component is oblong, specifically rod-shaped or wire-shaped, and the locating tongue slots into the locating slot at an orientation vertically across the long axis of the second component. In this configuration, the first component may be a an electrical connection contact and the second component may be an electrical conductor.

The locating slot is preferably located on a two-dimensional, preferably a lug-shaped, section of the first component such that it cuts through said section vertically across its long axis, wherein an open edge of the locating slot is located on the long side of the two-dimensional section, and wherein the locating tongue is opposite said long side when the components are placed at the joining position such that the locating tongue is approximately parallel to the long axis of said section as it is pushed into the locating slot. When the components have been placed at the joining point, their proper relative position can be easily verified visually, specifically on the flat side of the first component.

The method benefits from the positive substance joint between the components being produced by fusion welding, preferably by a beam of energy or an electric arc. The beam of energy may be a focused laser beam in particular. However, the method also works with electron beam welding.

In a preferred embodiment of the invention, the beam of energy deflects and/or is deflected laterally from a neutral position during the welding process. This provides a simple means of making up for position tolerances between the joining point and the beam of energy without having to move the components to be welded. A laser beam may be deflected by means of an acousto-optical modulator and/or by swiveling lenses. An electron beam may be deflected by electromagnetic means. Deflection is preferably two-dimensional in obliquely opposing directions. The beam may be deflected as it is being directed at the joining point, that is to say, at a time when the components to be substance joined are not exposed to any beam energy yet. Directing a laser beam at the joining point shall be construed as adjusting the beam path by means of a mirror, specifically a galvanometric mirror. Said mirror may be located inside a welding head. An alternative option is to use a kinematic apparatus (e.g. a robotic arm) to direct the laser beam at the joining point.

It is also possible to move the beam of energy in relation to the joining point by way of oscillation and to do so when the welding process has started. This is an advantageous alternative for welding larger joining points, specifically locating elements of a larger shape, while generating a positive effect on the physical properties of reflection, absorption, heat dissipation, fusion behavior and gas venting. There is no restriction to the shape along which the beam moves is not restriction except that it depends on the actual application (e.g. moving along a line or a circle or welding several separate dots on a locating lug).

In an advantageous embodiment of the invention, a preferably two-dimensional picture is taken of the components either while placing said components or afterwards. Said picture may be compared to a reference picture in order to detect and then to reduce differences in position. An image processor may be used to fully automatically check the state of the interlocked components before the positive substance joint is produced. This is supported by the joining point being clearly visible because the view on it is not obstructed by positioning or clamping devices.

Figure 2:
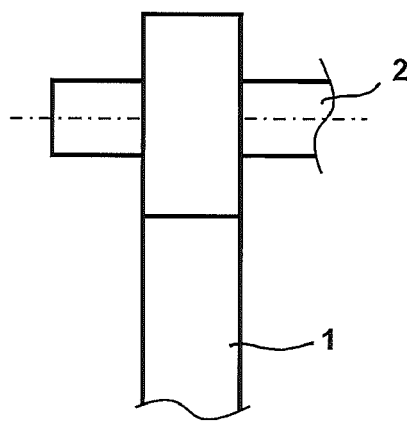
Figure 3:
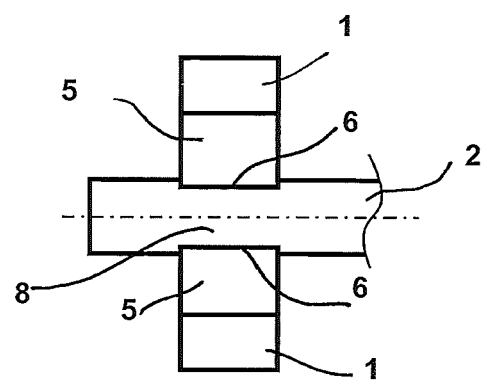
Figure 4:
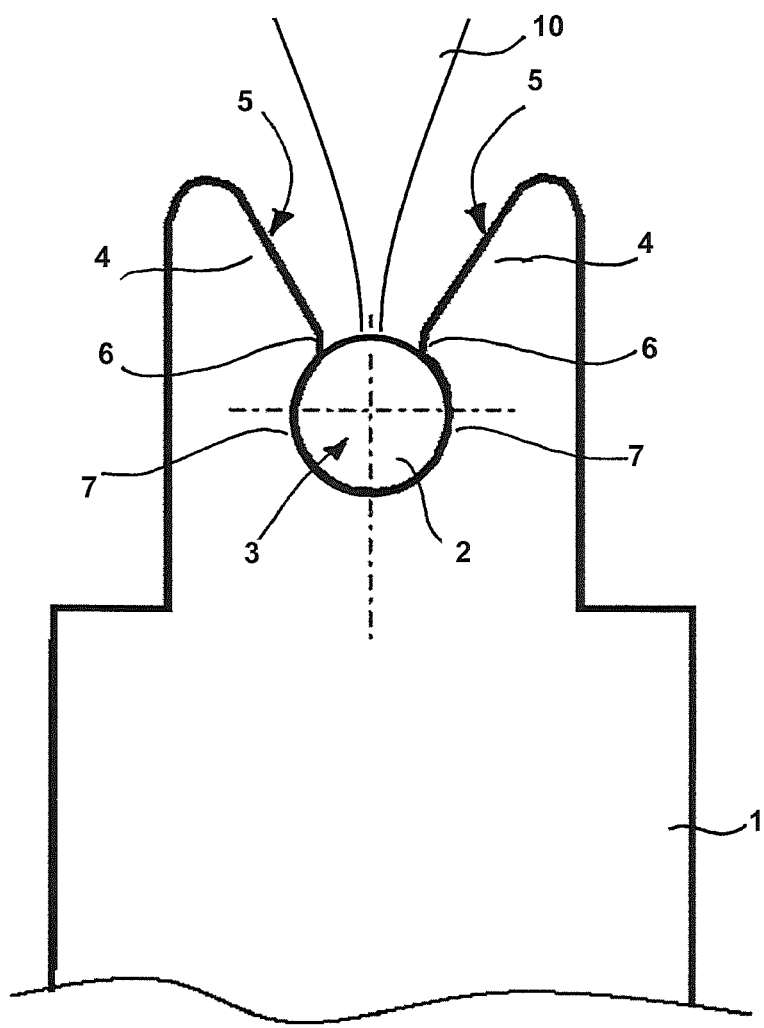
Figure 5:
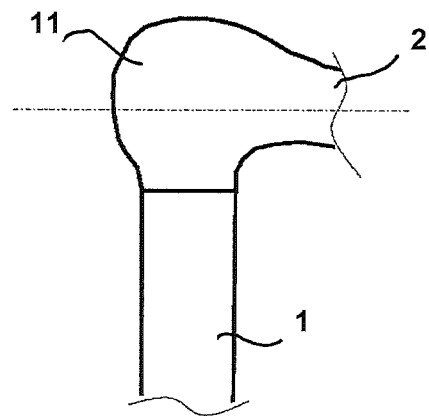
Figure 6:
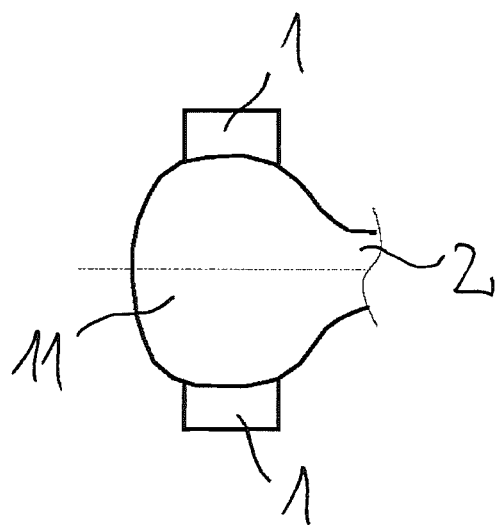
Figure 7:
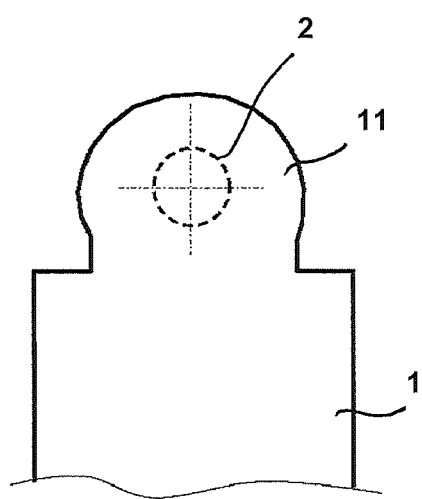

The figures attached hereto are taken to further explain the invention. The following is shown:

FIG. 1 a front view to two components to be welded at their preliminary mounting position, FIG. 2 a lateral view of the components at the joining position, FIG. 3 a top view of the arrangement of components at the joining position, FIG. 4 a front view of the components during the laser welding process, FIG. 5 a lateral view of the welded-up components, FIG. 6 a top view of the welded-up components, and FIG. 7 a front view of the welded-up components.

A method of producing a positive substance joint comprises the provisioning of a first component 1 and a second component 2. FIGS. 1 to 3 show that the first component 1 has a free section at the end which is shaped like a two-dimensional contact lug. A section abutting the contact lug of the first component 1 resides in a plastic holder not shown in detail. The second component 2 is designed as an electric connection wire with a circular cross-section. However, other designs are possible in which the second component 2 may have a square or rectangular cross-section.

FIG. 1 shows that a locating slot 3 is molded onto the first component 1 such that said locating slot 3 cuts through the first component 1 in a direction vertical to the long axis of the two-dimensional contact lug. The locating slot 3 is delimited at the side by opposing wall sections 4.

Said wall sections 4 are shaped like locking lugs whose long axes are approximately parallel. At the end facing the plastic holder, the locking lugs interconnect and make up an integral whole through a base section of the first component 1. The opposing free ends of the locking lugs face away from the plastic holder. The wall sections 4 are chamfered down said free ends such that the chamfered sides 5 face one another and such that the clear width between them diminishes from the free ends of the locking lugs towards the locating slot 3.

Down their inner faces facing the locating slot 3, each of the wall sections 4 has a protrusion 6 adjoining the locating slot 3. Inside the locating slot 3 and behind the protrusion 6, each of the wall sections 4 have a back-tapered section 7 which is covered by the corresponding protrusion 6. The clear width W between the most advanced points of the protrusions 6 is a little smaller than the corresponding dimension A of a locating tongue 8 of the second component 2 that will insert into the locating slot 3.

At a first step of the method, the first component 1 is moved to a previously defined position. The second component 2 is placed in a position with reference to the first component 1 and then moved to a preliminary mounting position such that its locating tongue 8 is opposite the locating slot 3. FIGS. 1 to 3 show that, at the preliminary mounting position, the long axis of the second component 2 cuts vertically across the long axis of the contact lug of the first component 1.

At a second step of the method, the second component 2 is moved vertically away from its long axis and, moving along the direction of the arrow 9, towards the first component 1 such that said second component 2 contacts the chamfered sides 5. The second component 2 pushes the wall sections 4 aside and resiliently apart, working against the restoring force of the material of the first component 1. When the widest point of the second component 2 has gone past the most advanced points of the protrusions 6, the wall sections 4 spring back towards their normal position such that the protrusions 6 are behind either side of the locating tongue 8. FIG. 4 shows how this produces a positive fit between the locating tongue 8 and the locating slot 3. The two components 1, 2 thus make up a relative arrangement at a previously defined joining position.

At a next step of the method, a beam of energy 10 is directed at the locating tongue 9 and/or to the edge area of the first component 1 adjoining the locating slot 3. Said beam of energy 10 locally melts the material of the first component 1 and the second component 2 in order to weld up the two components 1, 2. If and when required during the fusion welding process, the beam of energy 10 may be moved relative to the components 1, 2 and along any track within the area of the joining point. The diameter of the beam of energy 10 only schematically shown by FIG. 4 should preferably be as large in size as the diameter of the second component 2. If the diameter of the second component 2 is greater than 0.8 mm, the beam of energy 10 is injected at least twice along the edge of the second component 2.

In the case of an embodiment as shown by FIG. 4, the beam of energy 10 is a focused laser beam which a beam generating, beam shaping and positioning apparatus not shown in detail directs at the joining point such that said beam will pass through the free space left between the wall sections 4. FIGS. 4 to 7 show that, after the fusion welding process, a weld bead 11 joins the components 1, 2 at the joining point to make up an integral whole through the positive substance joint.

What is claimed is:

1. A method of creating a positive substance joint between components, comprising the steps of:
providing first and second components, said second component having a locating tongue and said first component having a locating device comprising a locating slot molded in said first component, said locating slot formed by opposing wall sections at its sides with a clear width between said wall sections that is narrower than a corresponding dimension of said locating tongue, each of said wall sections further having a back-tapered section comprising a portion of said locating slot;
setting said locating tongue in a preliminary mounting position in which said locating tongue is at a position opposite said locating slot; and
moving said locating tongue into said locating slot, resiliently deforming at least one of the opposing wall sections, and such that said back-tapered sections create a positive joint between said locating tongue and said locating slot.

2. The method of claim 1, characterized in that the locating slot has at least one chamfer along which the locating tongue is inserted.

3. The method of claim 1, characterized in that the locating slot is located between two fork-like locking lugs of the first component, and in that sections protrude from the inner face of the locking lugs facing the locating slot.

4. The method of claim 1, characterized in that the second component is oblong, specifically rod-shaped or wire-shaped, and in that the locating tongue slots into the locating slot at an orientation vertically across the long axis of the second component.

5. The method of claim 1, characterized in that the locating slot is located on a two-dimensional, preferably a lug-shaped, section of the first component such that it cuts through said section vertically across its long axis, in that an open edge of the locating slot is located on the long side of the two-dimensional section, and in that the locating tongue is opposite said long side when the components are placed at the joining position such that the locating tongue is approximately parallel to the long axis of said section as it is pushed into the locating slot.

6. The method of claim 1, characterized in that the components are fusion-welded, to produce a positive substance joint.

7. The method of claim 6, characterized in that, during the welding process, a beam of energy deflects and/or is deflected laterally from a neutral position.

8. The method of claim 6 wherein said fusion weld is by one of a beam of energy or an electric arc.

9. The method of claim 6 wherein a beam of energy is directed through a locating slot.

10. The method of claim 6 further comprising a beam of energy being injected twice along an edge of one of said components when the diameter of said components is greater than 0.8 millimeters.

11. The method of claim 9 wherein said deflection is by a galvanometric mirror.

* * * * *